(12) United States Patent
Nguyen et al.

(10) Patent No.: US 10,510,181 B2
(45) Date of Patent: Dec. 17, 2019

(54) SYSTEM AND METHOD FOR CACHE MANAGEMENT USING A CACHE STATUS TABLE

(71) Applicant: Samsung Electronics Co., Ltd., Suwon-si, Gyeonggi-do (KR)

(72) Inventors: Lam V. Nguyen, Cupertino, CA (US); Chris J. Goodman, Round Rock, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 101 days.

(21) Appl. No.: 15/702,722

(22) Filed: Sep. 12, 2017

(65) Prior Publication Data

US 2018/0374259 A1 Dec. 27, 2018

Related U.S. Application Data

(60) Provisional application No. 62/525,724, filed on Jun. 27, 2017.

(51) Int. Cl.
*G06T 15/30* (2011.01)
*G06T 1/20* (2006.01)
*G06F 12/0895* (2016.01)

(52) U.S. Cl.
CPC .......... *G06T 15/30* (2013.01); *G06F 12/0895* (2013.01); *G06T 1/20* (2013.01); *G06F 2212/454* (2013.01)

(58) Field of Classification Search
CPC ......... G06T 15/30; G06T 15/005; G06T 1/20; G06T 1/60; G06T 2212/1044; G06F 12/0895; G06F 2212/454; G06F 12/0875; G06F 2212/1044; G06F 2212/455
See application file for complete search history.

(56) References Cited

U.S. PATENT DOCUMENTS

| | | | |
|---|---|---|---|
| 6,424,343 B1 | 7/2002 | Deering et al. | |
| 6,597,363 B1 * | 7/2003 | Duluk, Jr. | G06T 15/005 345/506 |
| 9,299,123 B2 * | 3/2016 | Goel | G06T 1/20 |
| 9,613,392 B2 | 4/2017 | Kuo | |
| 9,639,366 B2 * | 5/2017 | Abdalla | G06T 17/20 |
| 2003/0142100 A1 * | 7/2003 | Lavelle | G06T 15/005 345/537 |

(Continued)

*Primary Examiner* — Chante E Harrison
(74) *Attorney, Agent, or Firm* — Renaissance IP Law Group LLP

(57) ABSTRACT

A clip-cull-viewport (CCV) unit manages information associated with vertices of a primitive as the primitive passes through the CCV unit. The CCV unit includes an index cache and a cache-status table. Vertices of a received primitive are stored in locations within the index cache based on attribute and index fields of the primitive. If a vertex is a reused vertex of another primitive that matches a valid entry in the cache-status table and if the primitive survives being culled, the valid entry in the cache-status table is preserved, the attribute field of the primitive is set to indicate that the vertex is a reused vertex, and the primitive is sent to an output interface for a downstream unit. Otherwise, the attribute field is set to indicate that the vertex is not reused, and the primitive is sent to the output interface for the downstream unit.

18 Claims, 4 Drawing Sheets

(56) References Cited

U.S. PATENT DOCUMENTS

| | | | |
|---|---|---|---|
| 2008/0094412 A1* | 4/2008 | Jiao | G06T 15/005 345/621 |
| 2010/0302246 A1* | 12/2010 | Jiao | G06T 1/20 345/426 |
| 2014/0085302 A1* | 3/2014 | Doyle | G06T 15/005 345/423 |
| 2015/0325037 A1 | 11/2015 | Lentz et al. | |
| 2015/0379672 A1 | 12/2015 | Wang | |
| 2016/0217550 A1 | 7/2016 | Lu et al. | |
| 2017/0098294 A1 | 4/2017 | Kim et al. | |
| 2017/0193691 A1* | 7/2017 | Langtind | G06T 1/20 |
| 2018/0300903 A1* | 10/2018 | Gierach | G06T 9/00 |
| 2018/0342040 A1* | 11/2018 | Nguyen | G06T 1/20 |

\* cited by examiner

SYSTEM AND METHOD FOR CACHE MANAGEMENT USING A CACHE STATUS TABLE

CROSS-REFERENCE TO RELATED APPLICATION

This patent application claims the priority benefit under 35 U.S.C. § 119(e) of U.S. Provisional Patent Application No. 62/525,724, filed on Jun. 27, 2017, the disclosure of which is incorporated herein by reference in its entirety.

TECHNICAL FIELD

The subject matter disclosed herein generally relates to a graphics processing unit (GPU), and more particularly, to a system and method for cache management using a cache status table.

BACKGROUND

A viewport is a polygonal-viewing region of a 3D scene that is rendered into a 2D image corresponding to a target area of a graphical display screen. A GPU may include one or more graphics pipelines to render a three-dimensional (3D) scene into a two-dimensional (2D) scene. Clipping may be one technique that is used to selectively enable or disable rendering operations within a defined region of interest (i.e., a target area) of a 3D scene. A clip-cull-viewpoint (CCV) unit within a CCV pipeline of a GPU typically provides clipping, culling (when required), and viewport transformations for rendering a 3D scene into a 2D scene. A primitive within a defined region of interest may be culled and the primitive is then not fetched, transformed, rasterized, or shaded if a graphic object associated with the primitive is determined to be invisible in the corresponding 2D scene.

A CCV unit may receive input primitives from a stream-out (SO) unit. A primitive received from the SO unit may be part of a stream of triangles in which two consecutive triangles may share one or two vertices. The CCV unit may clip, cull and/or transform a primitive based on a viewport, and send the result to a downstream destination unit, such as a binding (BIN) unit or a set-up (SU) unit.

A conventional approach to reduce data traffic through a CCV unit involves implementing two index caches (e.g., two 8-entry caches) in the CCV unit in which the first index cache is for the primitives received by the CCV unit and the second index cache is for primitives that are sent to the BIN unit (or the SU unit) to store the vertices that are shared between primitives in order to avoid re-sending the shared vertices to the BIN unit (or the SU unit). A similar cache may be implemented in the BIN unit (or the SU unit). If some primitives are culled, each vertex of a surviving primitive is compared against the corresponding index cache in the CCV unit to determine whether the vertex has been previously sent to the BIN unit (or the SU unit). This conventional approach uses a significant amount of memory space and has a relatively high power consumption.

SUMMARY

One example embodiment provides a clip-cull-viewport (CCV) unit that may include an input interface, an output interface and a control unit. The input interface may be coupled to a CCV pipeline to receive a plurality of primitives in which each primitive may include a plurality of vertices, a first attribute field and a first index field. The output interface may be coupled to the CCV pipeline to output primitives that survive culling to a downstream unit from the CCV unit. The control unit may be coupled to the input interface and to the output interface. The control unit may include an index cache and a cache-status table in which the cache-status table corresponds to an index cache in the downstream unit and each entry in the cache-status table may include a valid indicator. The control unit, in response to receiving a first primitive at the input interface, may store the vertices of the first primitive in locations within the index cache based on the first attribute field and the first index field of the first primitive, and may determine whether a vertex of the first primitive that is a reused vertex of another primitive based on the first attribute field matches a valid entry in the cache-status table. If the reused vertex matches a valid entry in the cache-status table and if the first primitive survives being culled, the control unit may preserve the valid entry in the cache-status table, set a second attribute field of the first primitive to indicate that the reused vertex corresponding to the valid entry in the cache-status table is a reused vertex, and send the first primitive, the second attribute field and a second index field to the output interface to output the first primitive to the downstream unit, in which the second index field may indicate an address in the cache-status table of the valid entry matching the reused vertex. If the reused vertex does not match a valid entry in the cache-status table and if the first primitive survives being culled, the control unit may determine a first non-preserved entry in the cache-status table and set the second index field to an address in the cache-status table of the first non-preserved entry, set the second attribute field to indicate that the reused vertex that does not match a valid entry in the cache-status table is now not reused, and send the first primitive, the second attribute field and the second index field to the output interface to output the first primitive to the downstream unit. In one embodiment, the downstream unit may be a binding unit or a set-up unit, and the CCV unit may receive the plurality of primitives from a stream-out unit.

Another example embodiment provides a clip-cull-viewport (CCV) unit that may include an input interface, an output interface, a first control unit and a second control unit. The input interface may be coupled to a CCV pipeline to receive a plurality of primitives in which each primitive comprising a plurality of vertices, a first attribute field and a first index field. The output interface may be coupled to the CCV pipeline to output primitives that survive culling to a downstream unit from the CCV unit. The first control unit may be coupled to the input interface and may be response to receiving a first primitive to determine whether the first primitive is to be culled. The second control unit may be coupled to the input interface, the output interface and the first control unit. The second control unit may include an index cache and a cache-status table, in which the cache-status table may correspond to an index cache in the downstream unit in the CCV pipeline and each entry in the cache-status table may include a valid indicator. The second control unit, in response to receiving the first primitive at the input interface, may store the vertices of the first primitive in locations within the index cache based on the first attribute field and the first index field of the first primitive, and may determine whether a vertex of the first primitive that is a reused vertex of another primitive based on the first attribute field matches a valid entry in the cache-status table. If the reused vertex matches a valid entry in the cache-status table and if the first primitive survives being culled, the second control unit may preserve the valid entry in the cache-status table, set a second attribute field of the first primitive to indicate that the reused vertex corresponding to the valid entry in the cache-status table is a reused vertex, and send the first primitive, the second attribute field and a second index field to the output interface to output the first primitive to the downstream unit, in which the second index field may indicate an address in the cache-status table of the valid entry matching the reused vertex. If the reused vertex does not match a valid entry in the cache-status table and if the first primitive survives being culled, the second control unit may determine a first non-preserved entry in the cache-status table and set the second index field to an address in the cache-status table of the first non-preserved entry, set the second attribute field to indicate that the reused vertex that does not match a valid entry in the cache-status table is now not reused, and send the first primitive, the second attribute field and the second index field to the output interface to output the first primitive to the downstream unit.

Yet another example embodiment may provide a method to reduce traffic in a clip-cull-viewport (CCV) pipeline, in which the method may include: receiving a first primitive from the CCV pipeline, the first primitive comprising a plurality of vertices, a first attribute field and a first index field; storing the vertices of the first primitive in locations within an index cache in a CCV unit based on the first attribute field and the first index field of the first primitive; determining whether a vertex of the first primitive is a reused vertex of another primitive based on the first attribute field matches a valid entry in a cache-status table in the CCV unit in which the cache-status table may correspond to an index cache in a downstream unit from the CCV unit in the CCV pipeline and each entry in the cache-status table may include a valid indicator. If the reused vertex matches a valid entry in the cache-status table and if the first primitive survives being culled, the method may further include preserving the valid entry in the cache-status table, setting a second attribute field of the first primitive to indicate that the reused vertex corresponding to the valid entry in the cache-status table is a reused vertex, and sending the first primitive, the second attribute field and a second index field to the downstream unit in the CCV pipeline in which the second index field may indicate an address in the cache-status table of the valid entry matching the reused vertex; and if the reused vertex does not match a valid entry in the cache-status table and if the first primitive survives being culled, the method may further include determining a first non-preserved entry in the cache-status table and set the second index field to an address in the cache-status table of the first non-preserved entry; setting the second attribute field to indicate that the reused vertex that does not match a valid entry in the cache-status table is now not reused, and sending the first primitive, the second attribute field and the second index field to the downstream unit in the CCV pipeline.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
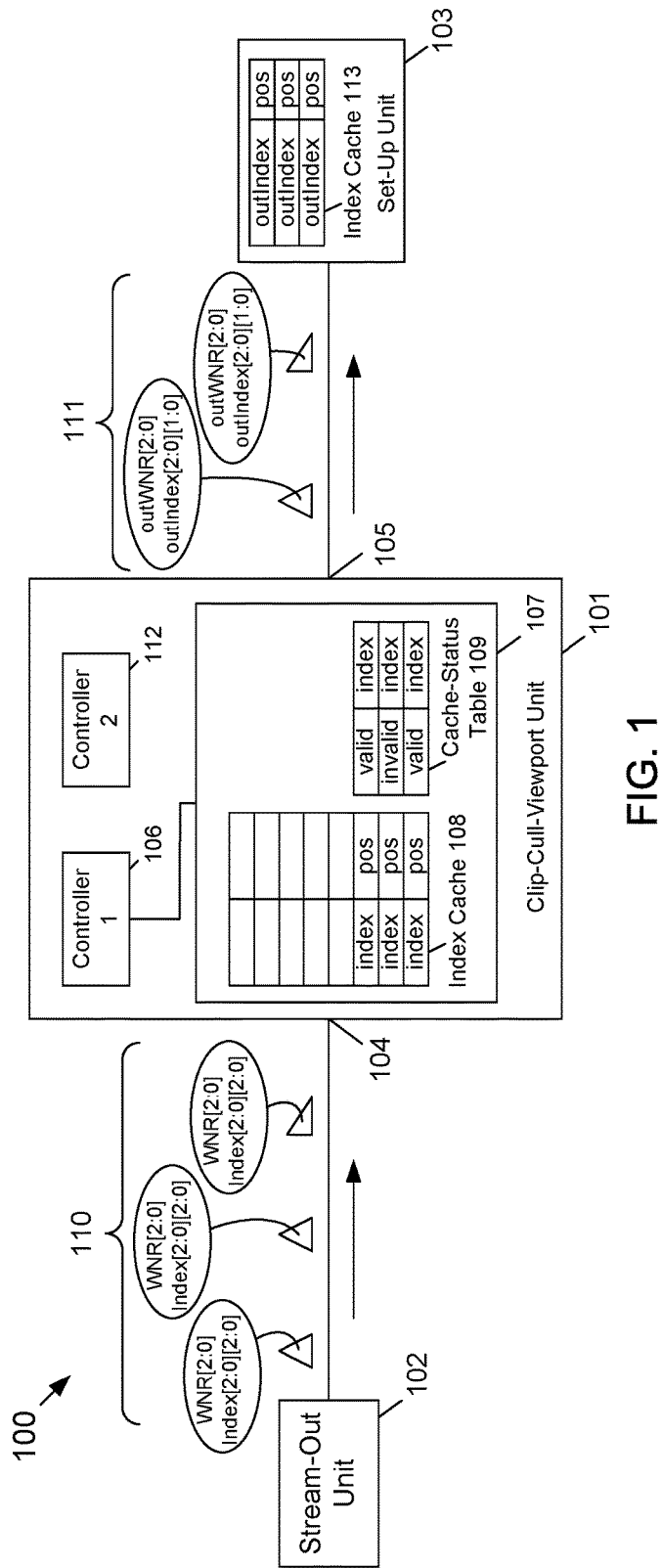
FIG. 1 depicts a flow of primitives through an example CCV pipeline that may be part of an example GPU according to one embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

According to one embodiment, a CCV unit in a CCV pipeline may include an 8-entry index cache and a 3-entry cache-status table. The cache-status table may contain indices of incoming vertices that are used to manage a corresponding 3-entry index cache in a downstream BIN unit and/or an SU unit. The CCV unit may use the cache-status table to manage the index cache in the downstream unit in order to reduce data traffic in a CCV pipeline. The cache-status table in the CCV unit may be smaller than the index cache in the CCV unit because many primitives that are received from an SO unit may be culled and may never reach the downstream BIN unit or SU unit. Thus, the CCV unit provides mapping of data from the larger 8-entry index cache to the smaller 3-entry cache-status table and maintains up-to-date data of the index cache inside the downstream BIN unit and/or the SU unit when one or more primitives are culled.

FIG. 1 depicts a flow of primitives through an example CCV pipeline 100 that may be part of an example GPU according to one embodiment. The CCV pipeline 100 includes the CCV unit 101, a stream-out (SO) unit 102, and a set-up (SU) unit 103. In one embodiment, the CCV unit 101 may receive two types of primitives from the SO unit 102 in which the first type of primitive is destined for the SU unit 103 and the second type of primitive is destined for a binding (BIN) unit (not shown). The CCV unit 101 processes both primitives independently and sends surviving primitives to the correct destination. Although the present disclosure is described mainly with respect to the CCV pipeline 100 including an SU unit 103, it should be understood that the present disclosure may apply to an SU unit 103 and/or a BIN unit (not shown) without deviating from the scope of the claimed subject matter.

The CCV unit 101 may include an input interface 104, an output interface 105, a controller (controller 1) 106 and a memory 107. The controller 106 may be coupled to the memory 107. The memory 107 may include an index cache 108 and a cache-status table 109. The various functional blocks of the CCV unit 101 depicted in FIG. 1 may be embodied as one or more modules formed from any combination of software, firmware and/or hardware that are configured to provide the functionality described in connection with the particular functional block. That is, the modules that may embody the functional blocks of the CCV unit 101 may collectively or individually be embodied as software, firmware and/or hardware that forms part of a larger system, such as, but not limited to, an IC, an SoC and so forth.

The SO unit 102 sends primitives 110 to the CCV unit 101 along the CCV pipeline via a primary bus (not shown) and a secondary bus (not shown), as indicated by the arrow between the SO unit 102 and the CCV unit 101. The primary bus may carry attributes associated with a primitive 110 in addition to a write-not-read (WNR) field and an Index field that are depicted in FIG. 1 as being associated with a primitive by balloon-type indicators. The secondary bus may carry position information of a vertex. In one embodiment, the CCV unit 101 may process one vertex per clock cycle.

The CCV unit 101 determines which primitives 110 may be culled and sends primitives 111 that have not been culled (i.e., primitives that survive culling) to the SU unit 103. One reason that a primitive 110 may be culled is if the primitive is outside of a viewport being processed by the CCV pipeline 100. Another reason that a primitive 110 may be culled is because an area of the primitive may be less than a predetermined area. Yet another reason that a primitive 110 may be culled is that the primitive may be outside of a zoom window. Other reasons that a primitive 110 may be culled may include the area of the primitive being equal to zero, the primitive 110 lies between sample points and does not cross any sample points, and/or the primitive 110 lies outside a predefined tile. In one embodiment, the controller 106 may process the received primitives 110 to determine whether a primitive is to be culled while also managing the amount of data sent downstream to the SU unit 103. In another embodiment, the CCV unit 101 may include a second controller (controller 2) 112 that provides culling-determination functionality, while the first controller 106 processes the received primitives 110 to manage the amount of data sent downstream to the SU unit 103. The controller 106 and the controller 112 may be communicatively coupled (not shown) to operate as a system.

In one embodiment, the index cache 108 may include eight entries. Vertex information associated with the primitives 110 that are received by the CCV unit 101 may be stored by the controller 106 in the index cache 108. In one embodiment, the information stored in the index cache 108 includes, but is not limited to, position (pos) of a vertex and a corresponding index. In another embodiment, the position of a vertex includes four dimensions: X, Y, Z, W. Other information that may be stored in the index cache 108 may include X/W, Y/W, Z/W, 1/W and a clip-code that determines if a vertex lies outside or inside a 3D view port box.

The cache-status table 109 may be used by the CCV unit 101 to accumulate information about primitives that are not culled and are to be sent to the SU unit 103. In one embodiment, the cache-status table 109 may include three entries in which each entry includes a valid/invalid indicator and the index in the index cache 108 that is associated with the vertex. In one embodiment the valid/invalid indicator may be a single bit.

The SU unit 103 includes an index cache 113 that corresponds to the cache-status table 109 in the CCV unit 101. In one embodiment, the cache-status table 109 may be a semi-clone of the of the index cache 113 in the SU unit 103 in which the cache-status table 109 includes a valid/invalid bit and an index for vertices of a primitive, whereas the index cache 113 includes position information and an outIndex for vertices of a primitive.

The WNR field of a received primitive 110 may include three bits, i.e., WNR[2:0], and the Index field may be a two-dimensional array in which each dimension may include three bits, i.e., Index[2:0][2:0]. In one embodiment, vertex[0] of a primitive 110 corresponds to the least significant bit (LSB) of the WNR field and the LSB of the Index field. Index[0] is three bits wide. Vertex[1] corresponds to the next significant bit of the WNR field and the next significant bit of the Index field. Index[1] is three bits wide. Vertex[2] corresponds to the most significant bit (MSB) of the WNR field and the MSB of the Index field. Index[2] is three bits wide. That is, Index[0] is associated with WNR[0] and the first vertex (i.e., vertex[0]) of a primitive 110. Index[1] is associated with WNR[1] and the second vertex (i.e., vertex[1]) of a primitive 110, and Index[2] is associated with WNR[2] and the third vertex (i.e., vertex[2]) of a primitive 110.

The WNR[2:0] field may be used to indicate whether vertices of a primitive 110 are new or reused. For example, if WNR[i] equals 1 (in which i may be equal to 0, 1 or 2), then the vertex[i] is a new vertex, and if WNR[i] equals 0, then the vertex[i] is a reused vertex. The Index[2:0][2:0] field of the primitives 110 may be used to indicate where in the index cache 108 to write vertex[i] of the received primitive 110 if the vertex is indicated to be new, and where to read data for the vertex[i] if the vertex is indicated to be reused. In other words, if WNR[i] equals 0, the CCV unit 101 uses the data at the address of Index[i] of the index cache 108 for vertex [i].

A primitive 110 and the contents of the associated WNR [2:0] and the associated Index[2:0] fields may pass through the CCV pipeline 100 if the primitive is not culled by the CCV unit 101. When a primitive 110 is received by the CCV unit 101, the primitive 110 is subjected to multiple culling processes to determine whether the primitive 110 can be discarded. During the culling processes, each of the vertices of the primitive 110 may be classified as a new vertex or a reused vertex based on the value of WNR field. As described above, WNR[i]=1 indicates that the $i^{th}$ vertex is new, and WNR[i]=0 indicates that the $i^{th}$ vertex is potentially reused.

Consider an example WNR[001] field of an example primitive 110 that is received by the CCV unit 101. The WNR[001] field indicates that vertex[0] of the primitive 110 is a new vertex, and that vertex[1] and vertex[2] of the primitive 110 are reused vertices. Upon receiving the example primitive 110, the CCV unit 101 would write vertex[0] into the 8-entry index cache 108 at the Index[0], and would use the data already in the index cache 109 at Index[1] and Index[2] for vertex[1] and vertex[2], respectively.

The primitives 111 sent by the CCV unit 101 to the downstream SU unit 103 may include an output write-not-read (outWNR) field and an index (outIndex) field, as depicted in FIG. 1 by balloon-type indicators. In one embodiment, the outWNR field may include three bits, i.e., outWNR[2:0], and the outIndex field may include three 2-bit numbers, i.e., outIndex[2:0][2:0], in which outIndex[0] is 2-bits wide, outIndex[1] is 2-bits wide and outIndex[2] is 2-bits wide. In one embodiment, vertex[0] of a primitive 111 corresponds to the LSB of the outWNR field and of the outIndex field (which is 2-bits wide), vertex[1] corresponds to the next significant bit of the outWNR field and the outIndex[1] field, and vertex[2] corresponds to the MSB of the outWNR field and the outIndex[2] field. That is, outIndex[0] is associated with outWNR[0] and the first vertex of an output primitive 111; outIndex[1] is associated with outWNR[1] and the second vertex of an output primitive 111; and outIndex[2] is associated with outWNR[2] and the third vertex of an output primitive 111. For example, if the outWNR[i] field for a primitive 111 is equal to 1, the vertex[i] is new, and if the outWNR[i] field for a primitive 111 is equal to 0, the vertex[i] is reused.

Consider another example incoming primitive 110 that has a WNR field equal to 110 with Index[2]=5, Index[1]=3, and Index[0]=7. The WNR field indicates that the CCV unit 101 receives two vertices of the primitive 110, vertex[1] and vertex[2]. The CCV unit 101 writes vertex[1] to the address 3 (i.e., Index[1]=3), and vertex[2] to the address 5 (i.e., Index[2]=5) in the index cache 108. The CCV unit 101 uses the data at the address 7 in the index cache 108 for vertex[0]. The Index[2:0] field of each outgoing primitive 111 is compared against the index in the cache-status table 109 to determine which vertices are to be sent to the SU 103, and which vertices already reside in the corresponding index cache 113 in the SU unit 103.

Figure 2:
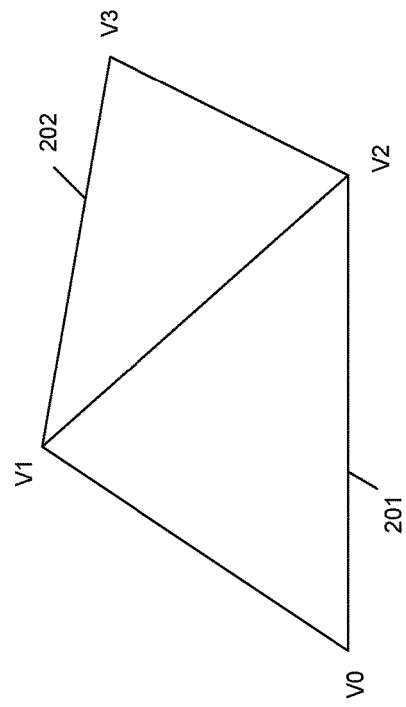
FIG. 2 depicts two example primitives that share two vertices V1 and V2 that may be processed by the example CCV unit in FIG. 1.

FIG. 2 depicts two example primitives (triangles) 201 and 202 that share two vertices V1 and V2 that may be processed by the example CCV unit 101 in FIG. 1. Consider that the two primitives 201 and 202 may pass through the CCV pipeline 100 and arrive at the CCV unit 101 with the following parameters. The primitive 201 has WNR=111, Index[0]=3, Index[1]=5, and Index[2]=7, and the primitive 202 has WNR=100, Index[0]=7, Index[1]=5, Index [2]=0.

After primitive 201 arrives at the CCV unit 101, the CCV unit 101 writes the data for the three vertices of the primitive 201 into the 8-entry index cache 108. Specifically, the data for vertex[0] (i.e., vertex V0) is written to location 3 in the index cache 108; the data for vertex[1] (i.e., vertex V1) is written to location 5 in the index cache 108; and the data vertex[2] (i.e., vertex V2) is written to location 7 in the index cache 108. When the primitive 202 arrives at the CCV unit 101, the data for vertex[0] (i.e., vertex V2) of the primitive 202 is already located at location 7 of the index cache 108. The data for vertex[1] (i.e., vertex V1) of the primitive 202 is located at location 5 in the index cache 108, and the data for vertex[2] (i.e., vertex V3) is written to location 0 in the index cache 108.

Figure 3:
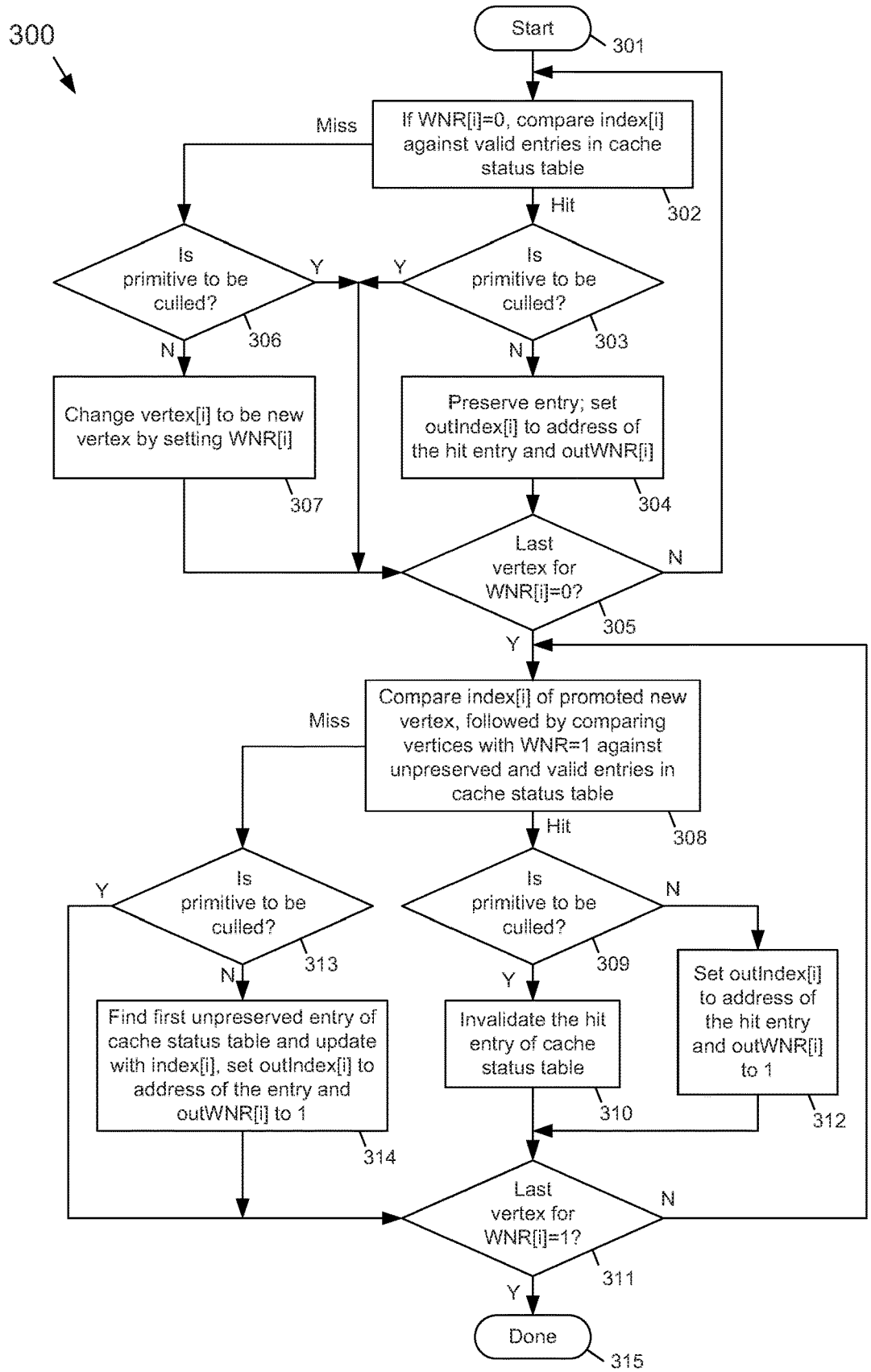
FIG. 3 depicts a flowchart of an example process to manage information associated with vertices of primitives as the primitives pass through the CCV unit to reduce data traffic in a CCV pipeline according to one embodiment.

FIG. 3 depicts a flowchart of an example process 300 to manage information associated with vertices of primitives as the primitives pass through the CCV unit 101 to reduce data traffic in the example CCV pipeline 100 according to an embodiment. That is, FIG. 3 shows how outWNR[2:0] and outIndex[2:0][2:0] are determined. In one embodiment, the controller 106 may provide the example process 300 by determining whether a primitive is to be culled and by managing the amount of data sent downstream to the SU unit 103. In another embodiment, the controller 112 may provide culling-determination functionality, while the controller 106 processes the received primitives 110 to manage the amount of data sent downstream to the SU unit 103.

The process starts at 301. If, at 302, WNR[i]=0 for a received primitive 110, the controller 106 compares the vertex at location index[i] in the 8-entry index cache 108 against the valid indexes in the 3-entry cache-status table 109. If, at 302, it is determined that there is a "hit," that is, the vertex at location index[i] in the index cache 108 already resides in the corresponding index cache 113 in the SU unit 103, the CCV unit 101 will ultimately indicate to the SU unit 103 to fetch that vertex from the index cache 113 in the SU unit 103 instead of sending the vertex (and all of the corresponding data) from the index cache 108 in the CCV unit 101. If there is a hit at 302, flow continues to 303 where it is determined whether the primitive 110 is to be culled.

If, at 303, the primitive 110 is not to be culled, flow continues to 304 where the entry in the cache-status table 109 that has been hit is preserved, outIndex[i] for the vertex is set to the index location of the hit entry (i.e., outIndex[i] for the vertex is set to the address of the hit entry in the cache-status table 109, which is 0, 1 or 2 because the cache-status table 109 has only three entries), and outWNR [i] is reset to be 0. Flow continues to 305 where it is determined whether the current vertex being evaluated is the last vertex of the received primitive 110. If, at 303, it is determined that the primitive 110 is to be culled, flow continues to 305 where it is determined whether the current vertex being evaluated is the last vertex with WNR=0 of the received primitive 110.

If at 302, there is not a hit, flow continues to 306 where it is determined whether the primitive 110 should be culled. If, at 306, the primitive 110 is not to be culled, flow continues to 307 where the vertex[i] is changed, or upgraded, to be a new vertex by setting WNR[i]=1. Flow continues to 305 where it is determined whether the current vertex being evaluated is the last vertex with WNR=0 of the received primitive 110. If, at 306, it is determined that the primitive 110 is to be culled, flow continues to 305 where it is determined whether the current vertex with WNR=0 being evaluated is the last vertex of the received primitive 110. If, at 305, it is determined that the current vertex being evaluated is not the last vertex with WNR=0 of the received primitive 110, flow returns to 302.

If, at 305, the current vertex being evaluated is the last vertex with WNR=0 of the received primitive 110, flow continues to 308 where the Index[i] of a just-upgraded-to-new vertex is compared against unpreserved and valid entries in the index cache table 109, followed by comparing vertices of the received primitive 110 that originally had a WNR bit equal to 1 against unpreserved and valid entries in the index cache table 109. In another embodiment, comparing vertices that originally had a WNR bit equal to 1 against unpreserved and valid entries in the index cache table 109 may be performed before comparing a just-upgraded-to-new vertex against unpreserved and valid entries in the index cache table 109. If, at 308, there is a hit, flow continues to 309 where it is determined whether the primitive 110 is to be culled.

If at 309, the primitive 110 is to be culled, flow continues to 310 where the hit entry in the cache-status table 109 is invalidated to indicate that the corresponding index cache 113 in the SU unit 103 contains stale data in the same entry. Flow continues to 311 where it is determined whether the current vertex being evaluated is the last vertex in which WNR=1 of the received primitive 110. If, at 309, the primitive 110 is not to be culled, flow continues to 312 where the outWNR bit for the vertex is set to 1 and the outIndex bit for the vertex is set to the address of the hit entry (i.e., the address of the hit entry that is 0, 1 or 2 because the cache-status table 109 has only three entries). That is, the hit entry in the cache-status table 109 is maintained with a valid status and its index is preserved. Flow continues to 311 where it is determined whether the current vertex being evaluated is the last vertex having WNR=1 of the received primitive 110.

If, at 308, there is a miss, flow continues to 313 where it is determined whether the primitive 110 is to be culled. If, at 313, the primitive 110 is not to be culled, flow continues to 314 where a search in the index cache 109 is performed from the smallest index location to the largest index location to find the first entry that has not been preserved. The corresponding entry in the index cache 109 is updated with the value of Index[i] and its status is set to valid. The outWNR bit for the vertex is set to 1, and outIndex for the vertex is set to the address of the entry. Flow continues to 311 where it is determined whether the current vertex being evaluated is the last vertex having WNR=1 of the received primitive 110.

If, at 313, if is determined that the primitive 110 is to be culled, flow continues to 311 where it is determined whether the current vertex being evaluated is the last vertex having WNR=1 of the received primitive 110. If, at 311, it is determined that the vertex being evaluated is not the last vertex of the primitive, flow returns to 308, otherwise flow continues to 315 where the process ends for the received primitive 110. A primitive 110 that survives culling and that has been processed as described in connection with the example process 300 of FIG. 3 is the sent as a primitive 111 to the downstream SU unit 103.

Referring again to the example primitives depicted in FIG. 2, consider that the primitive 201 arrives at the CCV unit 101 after a reset so all entries in the index cache 108 and the cache-status table 109 are invalid. Table 1 sets forth the contents of the cache-status table 109 in the CCV unit 101 after the primitive 201 arrives (assuming that that the primitive 201 survives culling) and the CCV unit 101 writes the primitive into the index cache 108 and the cache-status table 109.

TABLE 1

Cache-status Table 109 after arrival of Primitive 201.

|  | Status | Data |
| --- | --- | --- |
| Entry 0 | valid | 3 |
| Entry 1 | valid | 5 |
| Entry 2 | valid | 7 |

The CCV unit 101 sends the primitive 201 to the SU unit 103 with outWNR=111, index[0]=0, index[1]=1 and index [2]=2. Upon receiving the primitive 201, the SU unit 103 stores the first vertex at the entry 0 in the index cache 113, the second vertex at the entry 1 in the index cache 113, and third vertex at the entry 2 in the index cache 113. Table 2 sets forth the contents of the cache-status table 109 in the CCV unit 101 after the primitive 202 arrives (assuming that that the primitive 202 survives culling) and after the CCV unit 101 writes the primitive into the index cache 108 and the cache-status table 109.

TABLE 2

Cache-status Table 109 after arrival of Primitive 202.

|  | Status | Data |
| --- | --- | --- |
| Entry 0 | valid | 0 |
| Entry 1 | valid | 5 |
| Entry 2 | valid | 7 |

The primitive 202 is sent to the SU unit with outWNR=100, Index[0]=2, Index[1]=1 and Index[2]=0. Upon receiving the primitive 202, the SU 103 stores the new vertex at the entry 0 of its cache because WNR[2] is equal 1 and Index[2] is equal 0.

According to one embodiment in which the primitive 201 has been culled, the arrival of the primitive 202 with WNR=100, Index[0]=7, Index[1]=5 and Index[2]=0 causes the Index[0] to be compared against all entries in the corresponding cache-status table because WNR[0] is equal 0. There will be no match because all entries are invalid, so the vertex 0 of the primitive 202 is changed, or upgraded, to be a new vertex. The vertex 1 is similarly upgraded to be a new vertex. A further search is performed to determine available entries for vertex 0 and vertex 1 and, for example, entry 0 is assigned for vertex 0 and entry 1 is assigned for vertex 1. Vertex 2 is assigned entry 2 because WNR[2] is equal 1 and the entry 0 and entry 1 have already been taken. Table 3 sets for the contents of the cache-status table 109 after the primitive 201 has been culled and the primitive 202 arrives.

TABLE 3

Cache-status Table 109 after arrival of Primitive 202.

| | Status | Data |
| --- | --- | --- |
| Entry 0 | valid | 7 |
| Entry 1 | valid | 5 |
| Entry 2 | valid | 0 |

The primitive 202 is sent by the CCV unit 101 to the SU unit 103 with outWNR=111, outIndex[0]=0, outIndex[1]=1 and outIndex[2]=2. In this situation, the CCV unit 101 sends three vertices to the SU unit. Upon receiving the primitive 202, the SU unit 103 writes the vertex 0 at entry 0 of the index cache 113, the vertex 1 at entry 1, and the vertex 1 at entry 2.

Figure 4:
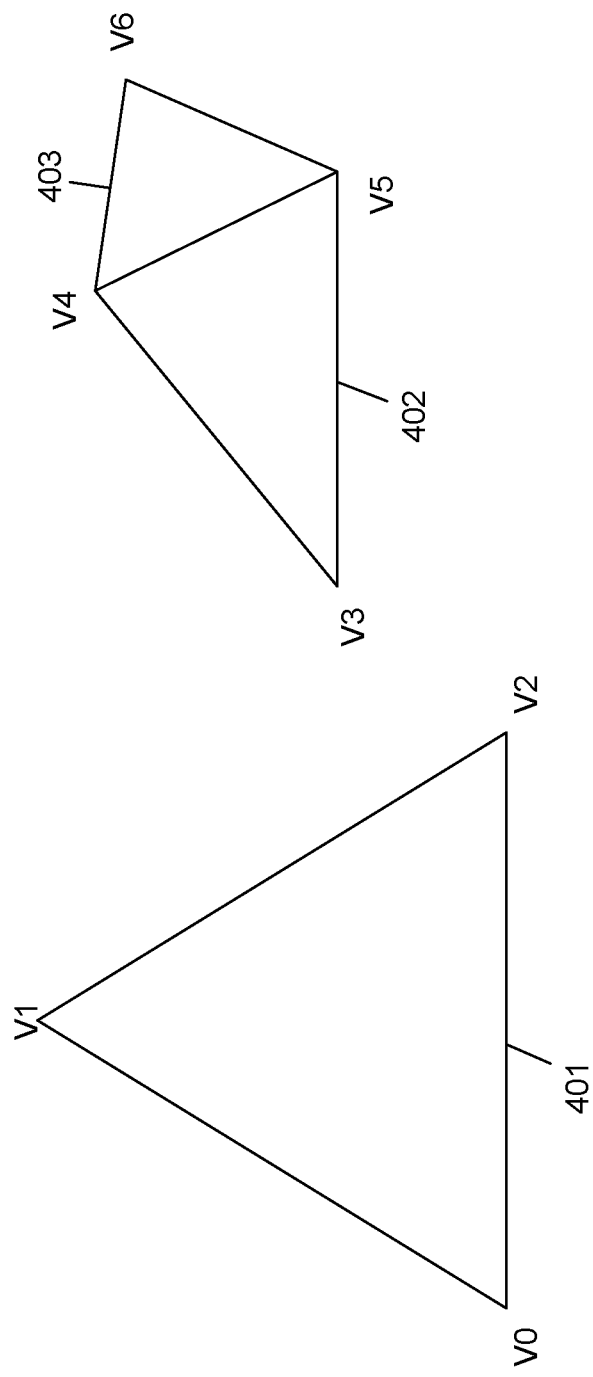
FIG. 4 depicts three example primitives that may pass through the example CCV pipeline of FIG. 1.

FIG. 4 depicts three example primitives (triangles) 401, 402 and 403 that may pass through the example CCV pipeline 100 of FIG. 1 with the following parameters. The primitive 401 has WNR=111, Index[0]=3, Index[1]=5 and Index[2]=7. The primitive 402 has WNR=111, Index[0]=3, Index[1]=5 and Index[2]=7. The primitive 403 has WNR=100, Index[0]=7, Index[1]=5 and Index[2]=0. Also consider that the primitive 401 and the primitive 403 survive one or more culling operations, but primitive 402 is culled.

After the primitive 401 arrives, the cache-status table 109 will have the same configuration as shown in Table 1. After the primitive 402 has been culled, the cache-status table 109 has a configuration as set forth in Table 4:

TABLE 4

Cache-status Table 113 after Primitive 402 has been culled.

| | Status | Data |
| --- | --- | --- |
| Entry 0 | Invalid | 3 |
| Entry 1 | Invalid | 5 |
| Entry 2 | Invalid | 7 |

Although the primitive 403 has WNR=100, there is no match for Index[0] and Index[1]. The primitive 403 is sent to the SU unit 103 with outWNR=111, outIndex[0]=0, outIndex[1]=1 and outIndex[2]=2 and the index cache 113 in the SU unit 103 has in entry 0 the position of vertex 0; in entry 1 the position of vertex 1; and in entry 2 the position of vertex 2.

Figure 5:
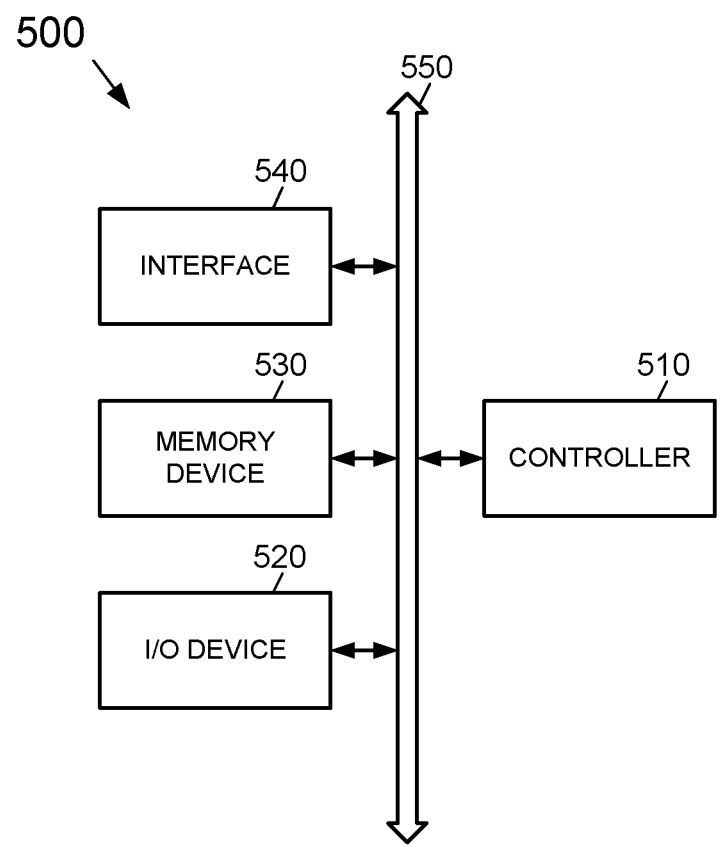
FIG. 5 depicts an electronic device that includes a CCV pipeline in which a CCV unit manages information associated with vertices of primitives as the primitives pass through the CCV unit to reduce data traffic in the CCV pipeline according to the one embodiment.

FIG. 5 depicts an electronic device 500 that includes a CCV pipeline in which a CCV unit manages information associated with vertices of primitives as the primitives pass through the CCV unit to reduce data traffic in the CCV pipeline according to the one embodiment. Electronic device 500 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 500 may include a controller 510, an input/output device 520 such as, but not limited to, a keypad, a keyboard, a display, a touch-screen display, a camera, and/or an image sensor, a memory 530, and an interface 540 that are coupled to each other through a bus 550. The controller 510 may include, for example, at least one microprocessor, at least one digital signal process, at least one microcontroller, or the like. The memory 530 may be configured to store a command code to be used by the controller 510 or a user data. Electronic device 500 and the various system components of electronic device 500 may form a system that provides a CCV pipeline in which a CCV unit manages information associated with vertices of primitives as the primitives pass through the CCV unit to reduce data traffic in the CCV pipeline according to the subject matter disclosed herein. The interface 540 may be configured to include a wireless interface that is configured to transmit data to or receive data from a wireless communication network using a RF signal. The wireless interface 540 may include, for example, an antenna, a wireless transceiver and so on. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A clip-cull-viewport (CCV) unit, the CCV unit comprising:
an input interface coupled to a CCV pipeline to receive a plurality of primitives, each primitive comprising a plurality of vertices, a first attribute field and a first index field, the first attribute field indicating whether each vertex of the primitive is a new vertex or a used vertex, and the first index field indicating where in an index cache each vertex of the primitive is to be written;

an output interface coupled to the CCV pipeline to output primitives that survive culling to a downstream unit from the CCV unit; and a control unit coupled to the input interface and to the output interface, the control unit comprising the index cache and a cache-status table, the cache-status table corresponding to an index cache in the downstream unit and includes entries that correspond to entries in the index cache in the downstream unit, each entry in the cache-status table including a valid indicator that indicates whether a vertex stored in the entry is a valid vertex, the control unit in response to receiving a first primitive at the input interface to store the vertices of the first primitive in locations within the index cache based on the first attribute field and the first index field of the first primitive, and determine whether a vertex of the first primitive that is a reused vertex of another primitive based on the first attribute field matches a valid entry in the cache-status table, the control unit to preserve the valid entry in the cache-status table, set a second attribute field of the first primitive to indicate that the reused vertex corresponding to the valid entry in the cache-status table is a reused vertex, and send the first primitive, the second attribute field and a second index field to the output interface to output the first primitive to the downstream unit based on the reused vertex matching a valid entry in the cache-status table and the first primitive surviving being culled, the second index field indicating an address in the cache-status table of the valid entry matching the reused vertex, and the control unit to determine a first non-preserved entry in the cache-status table and set the second index field to an address in the cache-status table of the first non-preserved entry, to set the second attribute field to indicate that the reused vertex that does not match a valid entry in the cache-status table is now not reused, and send the first primitive, the second attribute field and the second index field to the output interface to output the first primitive to the downstream unit based on the reused vertex not matching a valid entry in the cache-status table and the first primitive surviving being culled.

2. The CCV unit of claim 1, wherein the downstream unit comprises a binding unit or a set-up unit.

3. The CCV unit of claim 2, wherein the CCV unit receives the plurality of primitives from a stream-out unit.

4. The CCV unit of claim 1, wherein the control unit is further to cull the first primitive based on whether the first primitive being outside of a viewport associated with the first primitive, based on an area of the first primitive being less that a predetermined area, based on the area of the first primitive being zero, based on the first primitive being outside of a zoom window, or based on the first primitive being outside of a current tile.

5. The CCV unit of claim 1, wherein the index cache of the CCV unit comprises eight entries, and the cache-status table comprises three entries.

6. The CCV unit of claim 5, wherein each entry of the cache-status table further includes an index value for the vertex of the first primitive corresponding to the entry.

7. A clip-cull-viewport (CCV) unit, the CCV unit comprising:

an input interface coupled to a CCV pipeline to receive a plurality of primitives, each primitive comprising a plurality of vertices, a first attribute field and a first index field, the first attribute field indicating whether each vertex of the primitive is a new vertex or a used vertex, and the first index field indicating where in an index cache each vertex of the primitive is to be written;

an output interface coupled to the CCV pipeline to output primitives that survive culling to a downstream unit from the CCV unit;

a first control unit coupled to the input interface, the first control unit in response to receiving a first primitive to determine whether the first primitive is to be culled; and a second control unit coupled to the input interface, the output interface and the first control unit, the second control unit comprising the index cache and a cache-status table, the cache-status table corresponding to an index cache in the downstream unit in the CCV pipeline and includes entries that correspond to entries in the index cache in the downstream unit in the CCV pipeline, each entry in the cache-status table including a valid indicator that indicates whether a vertex stored in the entry is a valid vertex, the second control unit in response to receiving the first primitive at the input interface to:

store the vertices of the first primitive in locations within the index cache based on the first attribute field and the first index field of the first primitive, and to determine whether a vertex of the first primitive that is a reused vertex of another primitive based on the first attribute field matches a valid entry in the cache-status table, the second control unit to preserve the valid entry in the cache-status table, set a second attribute field of the first primitive to indicate that the reused vertex corresponding to the valid entry in the cache-status table is a reused vertex, and send the first primitive, the second attribute field and a second index field to the output interface to output the first primitive to the downstream unit based on the reused vertex matching a valid entry in the cache-status table and the first primitive surviving being culled, the second index field indicating an address in the cache-status table of the valid entry matching the reused vertex, and the second control unit to determine a first non-preserved entry in the cache-status table and set the second index field to an address in the cache-status table of the first non-preserved entry, to set the second attribute field to indicate that the reused vertex that does not match a valid entry in the cache-status table is now not reused, and send the first primitive, the second attribute field and the second index field to the output interface to output the first primitive to the downstream unit based on the reused vertex not matching a valid entry in the cache-status table and the first primitive surviving being culled.

8. The CCV unit of claim 7, wherein the downstream unit comprises a binding unit or a set-up unit.

9. The CCV unit of claim 8, wherein the CCV unit receives the plurality of primitives from a stream-out unit.

10. The CCV unit of claim 7, wherein the first control unit is further to cull the first primitive based on the first primitive is outside of a viewport associated with the first primitive, based on an area of the first primitive being less that a predetermined area, based on the area of the first primitive being equal to 0, based on the first primitive being outside of a zoom window, or based on the first primitive being outside of a current tile.

11. The CCV unit of claim 7, wherein the index cache of the CCV unit comprises eight entries, and the cache-status table comprises three entries.

12. The CCV unit of claim 11, wherein each entry of the cache-status table further includes an index value for the vertex of the first primitive corresponding to the entry.

13. A method to reduce traffic in a clip-cull-viewport (CCV) pipeline, the method comprising:
receiving a first primitive from the CCV pipeline, the first primitive comprising a plurality of vertices, a first attribute field and a first index field, the first attribute field indicating whether each vertex of the first primitive is a new vertex or a used vertex, and the first index field indicating where in an index cache each vertex of the first primitive is to be written, the index cache comprising eight entries;
storing the vertices of the first primitive in locations within an index cache in a CCV unit based on the first attribute field and the first index field of the first primitive; and
determining whether a vertex of the first primitive is a reused vertex of another primitive based on the first attribute field matches a valid entry in a cache-status table in the CCV unit, the cache-status table corresponding to an index cache in a downstream unit from the CCV unit in the CCV pipeline and includes entries that correspond to entries in the index cache in the downstream unit, each entry in the cache-status table including a valid indicator that indicates whether a vertex stored in the entry is a valid vertex,
performing the following based on the reused vertex matching a valid entry in the cache-status table and based on the first primitive surviving being culled,
preserving the valid entry in the cache-status table,
setting a second attribute field of the first primitive to indicate that the reused vertex corresponding to the valid entry in the cache-status table is a reused vertex, and
sending the first primitive, the second attribute field and a second index field to the downstream unit in the CCV pipeline, the second index field indicating an address in the cache-status table of the valid entry matching the reused vertex; and
performing the following based on the reused vertex not matching a valid entry in the cache-status table and based on the first primitive surviving being culled,
determining a first non-preserved entry in the cache-status table and set the second index field to an address in the cache-status table of the first non-preserved entry;
setting the second attribute field to indicate that the reused vertex that does not match a valid entry in the cache-status table is now not reused, and
sending the first primitive, the second attribute field and the second index field to the downstream unit in the CCV pipeline.

14. The method of claim 13, wherein the downstream unit comprises a binding unit or a set-up unit.

15. The method of claim 14, wherein the CCV unit receives the first primitive from a stream-out unit.

16. The method of claim 13, further comprising culling the first primitive based on the first primitive being outside of a viewport associated with the first primitive, based on an area of the first primitive being less that a predetermined area, based on the area of the first primitive being equal to 0, based on the first primitive being outside of a zoom window, or based on the first primitive being outside of a current tile.

17. The method of claim 13, wherein the index cache of the CCV unit comprises eight entries, and the cache-status table comprises three entries.

18. The method of claim 17, wherein each entry of the cache-status table further includes an index value for a vertex corresponding to the entry.

* * * * *